United States Patent
Costinel

(10) Patent No.: US 7,704,400 B2
(45) Date of Patent: Apr. 27, 2010

(54) METHOD AND APPARATUS FOR WASHING PARTICULATE MATTER

(76) Inventor: Paul Costinel, 240 - 222 Baseline Road, Sherwood Park, Alberta (CA) T8H 1S8

( * ) Notice: Subject to any disclaimer, the term of this patent is extended or adjusted under 35 U.S.C. 154(b) by 1041 days.

(21) Appl. No.: 11/278,112

(22) Filed: Mar. 30, 2006

(65) Prior Publication Data

US 2007/0227564 A1 Oct. 4, 2007

(51) Int. Cl.
*B01D 21/30* (2006.01)
(52) U.S. Cl. .................. 210/744; 134/40; 134/56 R; 210/86; 210/112; 210/117; 210/121; 210/207; 210/242.3; 210/519; 210/523; 210/534; 210/540; 210/771; 210/803; 210/804; 210/806; 210/188; 210/259; 96/219
(58) Field of Classification Search ............ 210/86, 210/103, 104, 112, 117, 118, 136, 173, 296, 210/299, 303, 319, 523, 532.1, 533, 534, 210/535, 538, 540, 770, 776, 774, 800–804, 210/180, 182, 187, 188, 259, 519, 242.1, 210/242.3, 121, 771, 772, 207, 806; 209/164, 209/208, 210; 134/26, 40, 56 R, 132, 133, 134/61, 63, 70, 94, 95.1, 95.2, 95.3, 99.1, 134/100.1, 102.1, 102.2, 102.3; 208/390, 208/391, 424, 425; 196/14.52; 96/155, 157, 96/158, 162, 218, 219; 422/255, 286, 287
See application file for complete search history.

(56) References Cited

U.S. PATENT DOCUMENTS

| | | | | |
|---|---|---|---|---|
| 2,224,345 A | * | 12/1940 | Heathman et al. | 137/174 |
| 2,231,269 A | * | 2/1941 | Holmes | 210/296 |
| 2,346,787 A | * | 4/1944 | Ramsey | 422/281 |
| 2,980,600 A | * | 4/1961 | Kelley | 196/46 |
| 3,223,243 A | * | 12/1965 | Muller | 210/242.3 |
| 3,271,293 A | * | 9/1966 | Clark | 208/391 |
| 3,273,318 A | * | 9/1966 | Meyer | 96/185 |

(Continued)

FOREIGN PATENT DOCUMENTS

CA 2185256 * 3/1998

(Continued)

OTHER PUBLICATIONS

Derwent Abstract for CA 2,185,256, Mar. 1998.*

*Primary Examiner*—Joseph W Drodge
(74) *Attorney, Agent, or Firm*—Oyen Wiggs Green & Mutala LLP

(57) ABSTRACT

A system for washing contaminated sand comprises a plurality of reactors arranged in a sequence from a first to a last reactor. The first reactor is configured to receive contaminated sand. Each reactor comprises a funnel portion in a lower section thereof for accumulating a sand layer and a sand conveying device for removing sand through an aperture defined near a bottom of the funnel portion. Each reactor except the first reactor receives sand removed from a previous reactor. The system also comprises a steam supply system for providing each reactor with steam for washing the sand, a water supply system for providing the last reactor with clean water for rinsing the sand, and a fluid outlet associated with each reactor for removing fluid and providing the fluid to a separator for separating the fluid into first and second portions respectively containing relatively low and high proportions of hydrocarbons.

24 Claims, 5 Drawing Sheets

U.S. PATENT DOCUMENTS

| | | | | |
|---|---|---|---|---|
| 3,800,513 | A * | 4/1974 | Lappin et al. | 96/319 |
| 3,954,415 | A * | 5/1976 | Davitt | 422/269 |
| 4,545,892 | A * | 10/1985 | Cymbalisty et al. | 208/391 |
| 5,062,953 | A * | 11/1991 | Lewan | 210/232 |
| 5,118,408 | A * | 6/1992 | Jansen et al. | 209/164 |
| 5,397,460 | A * | 3/1995 | Koblanski | 210/86 |
| 6,074,549 | A * | 6/2000 | Bacon Cochrane et al. | 208/391 |
| 6,527,960 | B1 * | 3/2003 | Bacon et al. | 210/741 |
| 2004/0238006 | A1 * | 12/2004 | Sears et al. | 134/19 |
| 2007/0227564 | A1 * | 10/2007 | Costinel | 134/94.1 |

FOREIGN PATENT DOCUMENTS

| | | |
|---|---|---|
| CA | 2319566 | 8/1999 |

* cited by examiner

METHOD AND APPARATUS FOR WASHING PARTICULATE MATTER

TECHNICAL FIELD

This invention relates to washing particulate matter such as sand. Particular embodiments provide methods and apparatus for removing hydrocarbons such as oil and other contaminants from sand originating from oil fields.

BACKGROUND

Sand which has been contaminated with hydrocarbons such as oil or other contaminants must generally be processed to remove the contaminants before the sand may be used in most industrial or agricultural applications. The processing of contaminated sand can be an expensive and time consuming operation.

Canadian Patent No. 2,319,566 to Bacon et al. discloses a process for separating oily films from sand particles carried as a slurry in a solvent-free water stream. The process disclosed by Bacon et al. utilizes scrubbers for detaching oil from sand and specially designed reactors for subsequent removal of oil from the slurry.

In practice, scrubbers have a highly detrimental emulsifying effect. Scrubbers break down oil particles that are bonded to sand granules into minute particles that form emulsions. Means for removing minute oil particles from water are generally ineffective. Emulsified oil contained by slurry migrates downstream and contaminates the sand product. Furthermore, a portion of the emulsified oil accumulates in water tanks and gradually contaminates the elutriation water utilized for sand rinsing.

Due to excessive agitation caused by scrubbers, solids-water separation in the reactors of Bacon et al. is critically hindered. As a result, sand may be carried over from the reactors and block surge tanks with deposits. Fines originating from the reactors may remain in suspension and tend to prematurely erode the jet pumps of Bacon et al.

Jet pumps employed for transferring sand between adjacent reactors in the process of Bacon et al. also emulsify oil and contribute to water and sand contamination. For optimal operation jet pumps pump a slurry that typically contains eight parts of water for two parts of sand. The relatively large quantity of water in the slurry requires relatively large reactors, dewatering devices and auxiliary equipment. As a result, capital and operating costs are increased significantly.

Furthermore, dewatering devices used for extracting the sand product from the slurry in the process of Bacon et al. experience various problems in handling large volumes of water. Such problems may include, premature shaker screen erosion, excessive sand carry over from screw hoppers, frequent failure of the decanter centrifuge coupling and erratic hydrocyclone operation.

More importantly, the inventor has determined that the operation of the jet pumps in the process of Bacon et al. cannot be effectively controlled to maintain a layer of sand at the lower region of the reactor. The sand layer normally acts as a barrier for contaminants. The loss of the sand layer occurs rather regularly and may result in unrestricted passage of contaminants through the reactors and contamination of the sand product.

There exists a need for methods and systems for washing sand which may be used to produce substantially contaminant-free sand without consuming large volumes of water.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a system for washing contaminated sand comprises a plurality of reactors arranged in a sequence from a first to a last reactor. The first reactor is configured to receive contaminated sand. Each reactor comprises a funnel portion in a lower section thereof for accumulating a sand layer and a sand conveying device for removing sand through an aperture defined near a bottom of the funnel portion. Each reactor except the first reactor receives sand removed from a previous reactor. The system also comprises a steam supply system for providing each reactor with steam for washing the sand, a water supply system for providing the last reactor with clean water for rinsing the sand, and a fluid outlet associated with each reactor for removing fluid and providing the fluid to a separator for separating the fluid into first and second portions respectively containing relatively low and high proportions of hydrocarbons.

Another aspect of the invention provides a method for washing sand contaminated with hydrocarbons. The method comprises providing a plurality of reactors for washing and rinsing sand, the plurality of reactors arranged in a sequence from a first reactor to a last reactor. introducing contaminated sand into the first reactor, and, for each reactor in the sequence, washing the sand with steam as the sand is introduced into the reactor, rinsing the sand with rinse water removed from a next reactor in the sequence, or with clean water in the case of the last reactor, removing fluid comprising water and hydrocarbons from the reactor, separating the removed fluid into a first portion containing a relatively low proportion of hydrocarbons and a second portion containing a relatively high proportion of hydrocarbons, providing the first portion to a previous reactor in the sequence for use as rinse water, or to a water outlet in the case of the first portion from the first reactor, forming a layer of sand in a bottom portion of the reactor, urging sand in the layer out of an aperture defined in the bottom of the reactor at a rate approximately equal to a rate at which sand is deposited on the layer to maintain a relatively constant thickness of the layer, and, providing the sand urged out of the aperture to the next reactor in the sequence, or to a sand output in the case of the last reactor.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

In drawing which illustrate non-limiting embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The invention provides systems and methods for washing particulate matter such as sand which is contaminated with hydrocarbons. For example, the invention may be applied to washing oil field sand which contains oil and/or other contaminants. The term "sand" is used herein to refer generally to any type of particulate material. In some embodiments of the invention, contaminants are removed from sand by passing the sand through a sequence of reactors. In each reactor the sand is washed with steam and rinsed with water. Sand may be removed from one reactor in the sequence by a sand conveying device and transferred to the next reactor in the sequence. The sand conveying device may use compressed air to remove the sand from the reactor.

Figure 1:
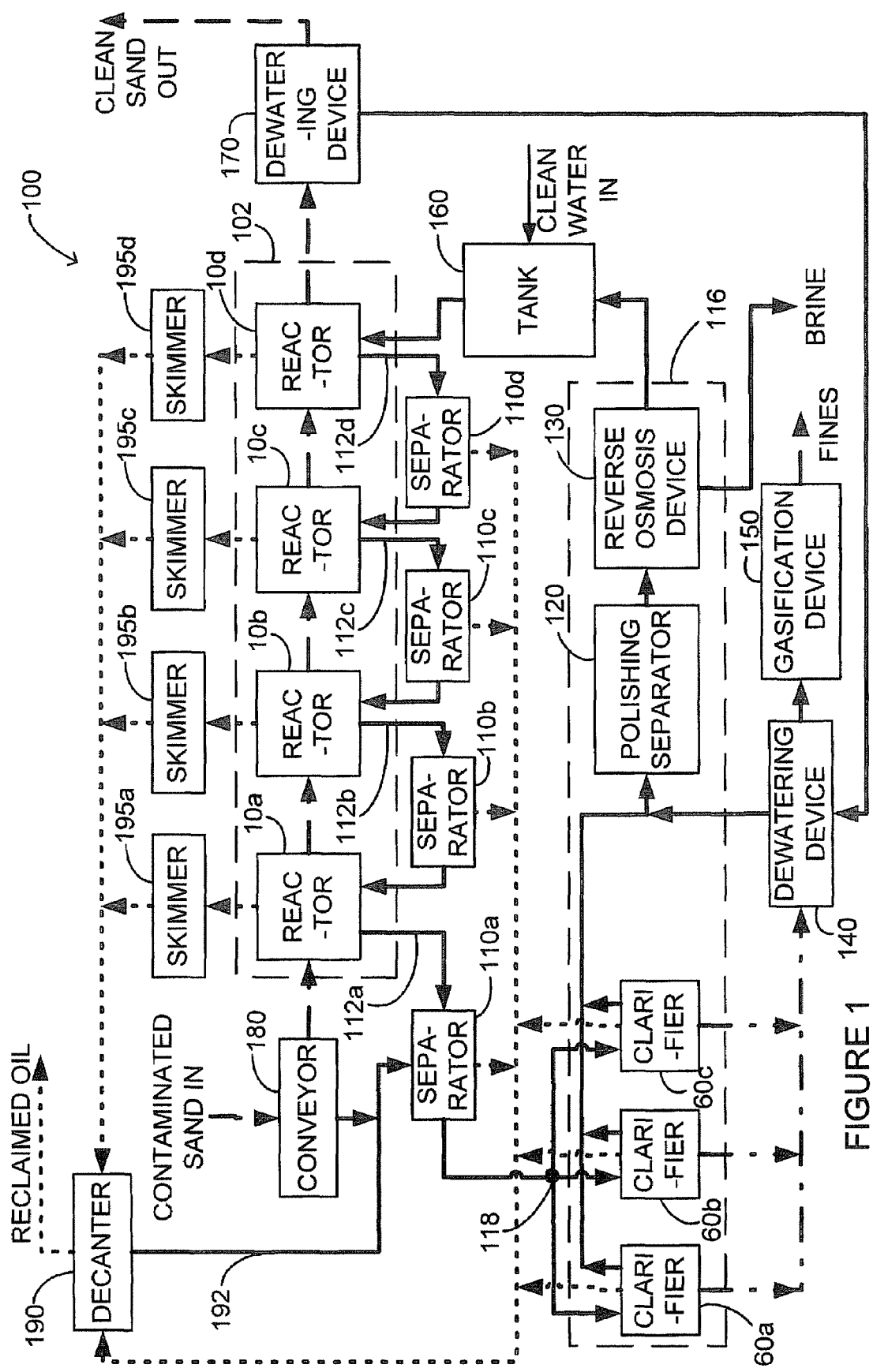
FIG. 1 shows a system for washing sand according to one embodiment of the invention.

FIG. 1 shows a system 100 according to one embodiment of the invention. System 100 comprises a sequence 102 of reactors 10a, 10b, 10c and 10d (collectively, reactors 10) which may be used to wash sand which has been contaminated with hydrocarbons such as oil. The contaminated sand may also contain other contaminants. Contaminated sand is passed through sequence 102 in one direction, and water is passed through sequence 102 in an opposite direction. The sand may be cleaned with steam and rinsed with water as it enters each reactor 10. Steam cleaning separates some of the contaminants from sand particles, so that a portion of the contaminants may be carried away by the rinse water. Four reactors 10 are shown in FIG. 1, but is to be understood that sequence 102 may be made up of any suitable number of reactors 10.

System 100 may comprise a conveyor 180 for providing contaminated sand to a first reactor 10a. Flow of sand in system 100 in FIG. 1 is represented by thick dashed lines. Conveyor 180 may partially dewater sand fed to first reactor 10a. Any water accumulated in conveyor 180 may overflow to a first separator 110a. Conveyor 180 may comprise, for example, a bucket elevator conveyor, a conveyor belt, or other mechanism capable of providing sand to first reactor 10a. Contaminated sand may be taken from, for example, an oil field, and washed by system 100 so that it may be returned to the environment.

Reactors 10 in sequence 102 may be arranged in a vertical stack, with first reactor 10a being the topmost in the stack and a last rector 10d being the bottommost in the stack, such that sand may fall from the sand outlet of one reactor 10 into the next reactor 10. Alternatively, sand leaving one reactor 10 may be conveyed to the next reactor 10 in sequence 102 by a suitable conveyor (not shown).

Each reactor 10 may comprise a conveying device (not shown in FIG. 1) for removing sand from that reactor 10. The conveying device may optionally be configured to limit the amount of water removed from reactor 10 along with the sand. This advantageously reduces both the amount of contaminants transferred between reactors 10, and the amount of water which must be removed from the sand removed from last reactor 10d. The conveying device assists gravity in urging sand in reactor 10 out of an aperture (not shown in FIG. 1) in a bottom portion of reactor 10 at a controlled rate. An example conveying device is described below with respect to FIG. 3.

System 100 may also comprise a dewatering device 170 for receiving clean sand and water from a last reactor 10d. In embodiments wherein sand is partially dewatered as it is removed from each reactor 10, dewatering device 170 does not need to remove large quantities of water from the clean sand. Water removed by dewatering device 170 may be provided to another dewatering device 140 for recycling, as described below. The clean sand that exits dewatering device 170 is preferably in compliance with applicable environmental and transportation standards. Dewatering device 170 may comprise, for example, a basket centrifuge. Alternatively, dewatering device 170 may comprise a shaker, a dewatering auger, or other mechanism capable of separating water from sand.

Each reactor 10 has a fluid outlet 112 for removing excess fluid comprising rinse water and dissolved or suspended contaminants from that reactor 10. Each reactor 10 preferably has a separator 110 associated therewith. Excess fluid comprising rinse water and dissolved or suspended contaminants from each reactor 10 is provided to the associated separator 110 through fluid outlet 112. The fluid is separated into a first portion containing a relatively low proportion of hydrocarbons and a second portion containing a relatively high proportion of hydrocarbons in the associated separator 110. Each separator 110 provides the hydrocarbon-rich second portion to a decanter 190. Flow of the hydrocarbon-rich second portion and of oil is represented by thick dotted lines in FIG. 1. Decanter 190 separates oil and other hydrocarbons from water by gravity. Alternatively, any suitable mechanism for separating oil from water may be provided in place of decanter 190. Decanter 190 may output oil and any other hydrocarbons to a storage device (not shown), and may output water to first separator 110a as indicated by line 192.

Each reactor 10 may also have an oil skimmer 195 associated therewith. Oil skimmers 195 remove a film of oil which builds up on the surface of the rinse water in reactors 10 as sand which has been contaminated with oil is washed. Oil skimmers 195 provide skimmed oil to decanter 190.

Each separator 110 provides the relatively hydrocarbon-free first portion to the previous reactor 10 in sequence 102 for use as rinse water. A last reactor 10d receives clean rinse water from a tank 160. Water may be supplied to tank 160 from a suitable source such as river or lake. For higher product quality it is essential to provide water with a very low total dissolved solids (TDS) content. In certain situations distilled water may be utilized to meet TDS content requirements.

A first separator 110a which is associated with a first reactor 10a provides the relatively hydrocarbon-free first portion to a purifying system 116. Flow of water and the first portion of the excess fluid from reactors 10 is represented by thick solid lines in FIG. 1.

Purifying system 116 may comprise, for example, a plurality of clarifiers 60. Clarifiers 60 are connected to receive the relatively hydrocarbon-free first portion from first separator 110*a*. Each clarifier 60 may comprise, for example, a settling tank. The first portion remains in each clarifier 60 for a settling period so that fines have time to settle. After the settling period, oil may be skimmed from off the top of the liquid in clarifier 60 and provided to decanter 190. Fines which have settled in clarifier 60 are removed (flow of fines is represented by thick dot-dashed lines in FIG. 1), leaving a clarified water which is substantially free from sand, fines and contaminants remaining in clarifier 60. The clarified water is then removed from clarifier 60, such that clarifier 60 is ready to be filled again with the first portion of fluid from first separator 110*a*.

A valve 118 may be provided and configured to direct the first portion of fluid from first separator 110*a* into each of clarifiers 60 in turn. For example, clarifier 60*a* may be filled initially, then clarifier 60*b* may be filled during the settling period for clarifier 60*a*. After the settling period for clarifier 60*a* ends, the settling period for clarifier 60*b* begins. During the settling period for clarifier 60*b*, clarifier 60*a* may be emptied as described above and clarifier 60*c* may be filled. Once clarifier 60*c* has been filled, clarifier 60*b* may be emptied and clarifier 60*a* may be filled during the settling period for clarifier 60*c*. This cycle may be repeated, such that clarifiers 60 may accept a continuous flow of the first portion of fluid from first separator 110*a*.

Three clarifiers 60 are shown in FIG. 1, but it is to be understood that system 100 could comprise a different number of clarifiers 60. For example additional clarifiers 60 could be provided. If more clarifiers 60 are provided, each clarifier 60 could have a smaller capacity. Alternatively, system 100 could comprise only two clarifiers 60, with one being filled while the other allows settling and is emptied. However, the inventor has determined that clarification may not be as efficient in embodiments comprising only two clarifiers 60 as opposed to embodiments comprising three or more clarifiers 60.

Fines (including clay) that are removed from clarifiers 60 may be provided to a dewatering device 140. Dewatering device 140 may also be connected to receive water removed from the clean sand by dewatering device 170. Dewatering device 140 may comprise, for example, a decanter centrifuge. Fines separated from water create a cake that is evacuated periodically from dewatering device 140. A small amount of oil may contaminate the cake and pose a hazard to the environment. A gasification device 150 may be provided to receive the cake and burn and/or pyrolyze the oil. Gasification device 150 renders the cake inert and therefore suitable for disposal.

Purifying system 116 may also comprise a polishing oily-water separator 120. Polishing oily-water separator 120 is connected to receive clarified water from clarifiers 60. Polishing oily-water separator may also be connected to receive water from dewatering device 140. Polishing oily-water separator 120 may be capable of reducing the hydrocarbon content below a predetermined level. The predetermined level may be 5 mg/l, for example. Polishing oily-water separators are well known in the art. Polishing oily-water separator 120 may comprise, for example, a coalescing plate-type separator.

Purifying system 116 may also comprise a desalination device such as, for example, a reverse osmosis device 130 connected to receive the substantially oil-free clarified water from polishing oily-water separator 120. Reverse osmosis device 130 may be configured to remove dissolved solids from the water, for example producing purified water having a total dissolved solid content of below 150 mg/l. The purified water can be recycled and delivered to tank 160. Brine resulting from purifying the water in reverse osmosis device 130 may be pumped to a disposal well.

Figure 2:
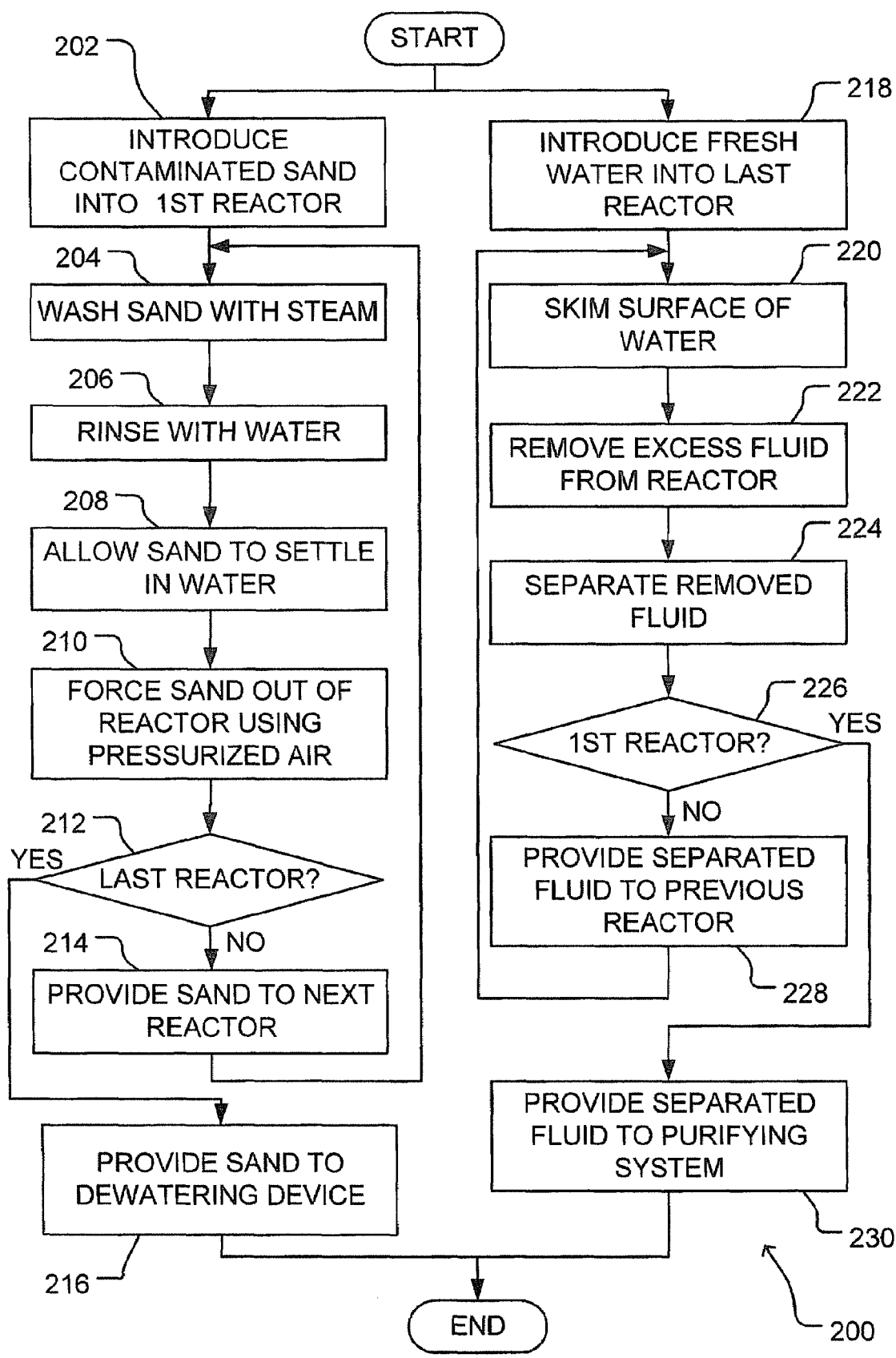
FIG. 2 is a flowchart illustrating steps in a method of washing sand according to one embodiment of the invention.

FIG. 2 shows a method 200 of washing sand according to one embodiment of the invention. Method 200 comprises a sand cycle 201 and a liquid cycle 203. Sand cycle 201 and liquid cycle 203 may occur concurrently in a system comprising a sequence of reactors.

In sand cycle 201, contaminated sand is introduced into a first reactor at block 202. The sand is washed with steam at block 204. At block 206, the sand is rinsed with water. In example embodiments, the rinse water is provided either from the next reactor or from a tank, as described below. At block 208 the sand is allowed to settle to form a layer at the bottom of the reactor. At block 210 the sand in the layer is removed from the reactor. Block 210 may comprise using compressed air to force sand in the layer out of the reactor. Use of compressed air further reduces the amount of water (which contains contaminants removed from the sand) which exits the reactor along with the sand. If the sand is not being removed from the last reactor (block 212 NO output), the sand is provided to the next reactor in the sequence at block 214, and sand cycle 201 returns to block 204. Sand which is being removed from the last reactor (block 212 YES output) is provided to a dewatering device at block 216, after which sand cycle 201 ends.

In liquid cycle 203, fresh water is introduced into the last reactor in the sequence at block 218. This fresh water is used as the rinse water in the last reactor at block 206 of sand cycle 201. At block 220 the surface of the water in the reactor is skimmed, and any hydrocarbons are removed from the reactor and provided to a decanter for reclaiming hydrocarbons. At block 222 excess fluid is removed from the reactor. At block 224 the excess fluid is separated into a first portion which has a relatively low concentration of hydrocarbons and a second portion which has a relatively high concentration of hydrocarbons, and the second portion is provided to the decanter. If the first portion is separated from fluid removed from a reactor other than the first reactor (block 226 NO output), the first portion is provided to the previous reactor in the sequence at block 228 for use as rinse water at block 206 of sand cycle 201, and liquid cycle 203 returns to block 220. If the first portion is separated from fluid removed from the first reactor (block 226 YES output), the first portion is provided to a purifying system at block 230, after which liquid cycle 203 ends.

Figure 3:
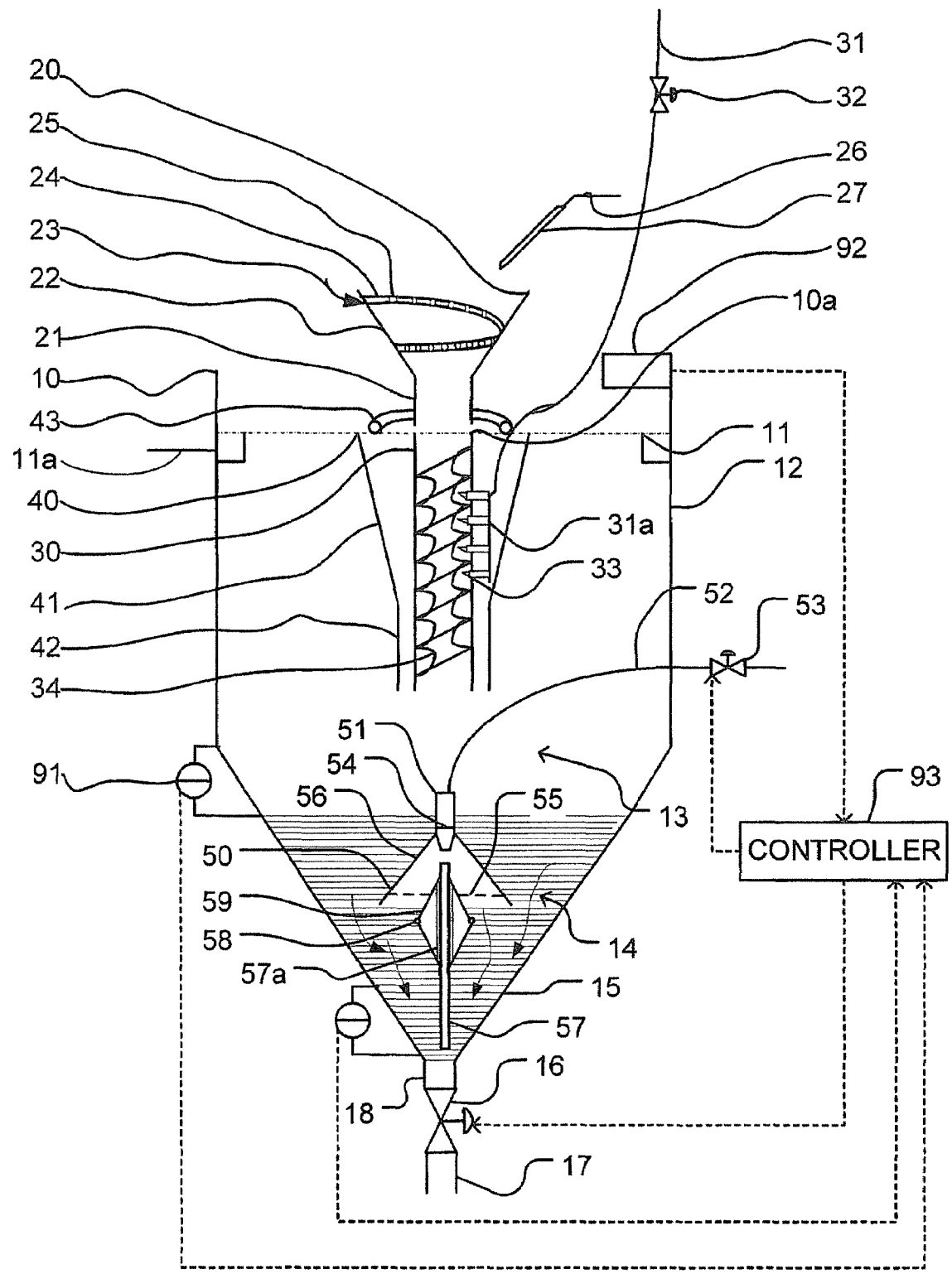
FIG. 3 shows a reactor for washing sand according to one embodiment of the invention.

FIG. 3 shows a reactor 10 according to one embodiment of the invention. Reactor 10 comprises a cylindrical section 12 and a generally conical section 15. An upper part of cylindrical section 12 comprises a circular weir 11 disposed concentrically with the periphery of section 12. The level of rinse water that contains contaminants removed from sand in reactor 10 is determined by weir 11. When the fluid level in reactor 10 rises above weir 11, the excess fluid overflows and is provided to an associated separator (not shown in FIG. 3, see FIG. 1) via conduit 11*a*.

A steam cleaning device 20 is disposed in the central portion of reactor 10. Device 20 may be generally Y-shaped in cross-section, and may comprise a frusto-conically-shaped funnel portion 22 affixed to cylindrical portion 21 by welds or other suitable means. Contaminated sand is introduced to reactor 10 by dropping it into funnel portion 22 of steam cleaning device 20.

A tube 24 may be attached to the inside surface of funnel portion 22. Tube 24 is preferably made from flexible material that is resistant to oil and high temperatures. Tube 24 is helically shaped and affixed to an inner surface of funnel portion 22 by way of suitable attachments. Tube 24 prolongs the movement of sand in funnel portion 22 and exposes said sand to steam cleaning. Tube 24 may have a plurality of perforations 25 defined therein. Perforations 25 may be equally spaced along the length of tube 24.

An upper end of tube 24 may be connected to a hose 23. Hose 23 supplies a trickle of water to tube 24 in order to continually rinse hydrocarbons from tube 24. A lower end of tube 24 may be located in the vicinity of a rope 43 of an oil skimmer (not shown in FIG. 3, see FIG. 1).

A steam gun 27 is in fluid communication with a steam conduit 26 and is supplied with steam from a steam generator (not shown in FIG. 3). Steam gun 27 projects steam and hot water droplets with high velocity against oil-contaminated sand. During the steam cleansing process funnel portion 22 and tube 24 guide the sand on a helical trajectory. A large portion of oil and grease fluidized by steam emerges from the sand and, assisted by drops of hot water, enters tube 24 via perforations 25. Furthermore, minute hydrocarbon particles coalesce due to heating by the steam and form globules that enter tube 24 through perforations 25. Hydrocarbons entering tube 24 are rinsed out of the lower end of tube 24 and form a hydrocarbon later on the surface of the water in reactor 10 within rope 43.

Reactor 10 may also comprise a rinsing device 30. Rinsing device 30 may comprise a cylinder that houses a static auger 34. The upper end of rinsing device 30 is situated slightly below the water level. A plurality of spray nozzles 33 may be affixed to the external walls of rinsing device 30 by means of, for example, threadable mountings. Each spray nozzle 33 is disposed between two adjacent flights of auger 34. Nozzles 33 are inclined at a suitable angle, for example at an angle in the range of 25 to 75 degrees, to prevent sand from blocking nozzles 33. A line 31 supplies rinse water under pressure to spray nozzles 33 through a manifold 31a. A shut-off valve 32 in line 31 controls the flow of rinse water.

Sand that drops through cylindrical portion 21 of steam cleaning device 20 reaches the surface of the rinse water accumulated in reactor 10. Sand then descends towards static auger 34 and leaves behind a portion of hydrocarbon contaminants on the surface of the rinse water. Primary oil-water separation takes place by gravity in the region above auger 34. Hydrocarbons emerge through an aperture 10a defined between cylindrical portion 21 of steam cleaning device 20 and rinsing device 30 and spread on the surface of the water around rinsing device 30.

Hydrocarbons then reach the oil absorbent rope 43 of an oil skimmer (not shown in FIG. 3). Rope 43 forms a loop in the vicinity of steam cleaning device 20 and contains hydrocarbons in an area delimited around steam cleaning device 20. Rope 43 moves continually or intermittently along the surface of the water and absorbs oil which forms a film on the surface. Rope 43 reaches a pair of rollers and a scraper (not shown in FIG. 3) designed to remove oil. After being rendered substantially oil-free, rope 43 resumes oil absorption from the surface of the water. Rope 43 may be made from a material capable of extracting froth that may form by way of water aeration when sand impacts the water surface. Alternatively, a different type of oil skimmer could be provided which does not use a rope.

Between each flight of auger 34, sand is vigorously rinsed by means of water jets formed by spray nozzles 33. A relatively small portion of hydrocarbons rises to the water surface above auger 34 and merges with hydrocarbons removed from the sand by steam cleansing.

Auger 34 prevents sand from dropping directly into a lower region 13 of reactor 10 and exposes said sand to the rinsing action of nozzles 33. Auger 34 also creates a quiet zone (i.e., a zone with reduced agitation) below rinsing device 30, which facilitates solids-water separation in lower region 13 of reactor 10.

A small quantity of sand may be entrained by liquid flowing through aperture 10a. Such sand does not follow the path through rinsing device 30 defined by auger 34, but may instead be directed to the lower region 13 of reactor 10 by a sand sedimentation device 40.

Sand sedimentation device 40 may be generally funnel-shaped and disposed concentrically with rinsing device 30. Sand sedimentation device 40 may comprise, for example, a conical portion 41 and a cylindrical portion 42. Conical portion 41 of device 40 captures fine particles of sand ("fines") that are inadvertently entrained in liquids flowing through aperture 10a. Fines are then directed downwardly to cylindrical portion 42 and from there to the settling zone in lower region 13. The inner walls of conical portion 41 are preferably inclined at angles exceeding 60 degrees to preclude unintended sedimentation of fines thereon. The upper edge of conical portion 41 preferably rises slightly above the water surface to prevent these fines and hydrocarbons from being carried over to weir 11. Sand and most fines migrate towards the bottom portion of reactor 10 where they settle and form a layer 14. Sand which has been deposited in layer 14 restricts the migration of contaminants downstream from reactor 10.

A portion of the hydrocarbons that are detached from sand by way of rinsing mixes with the rinse water and flows towards the exit of rinsing device 30. Upon emerging from rinsing device 30, the rinse water containing hydrocarbons reverses its flow and travels upwardly through a mid section of reactor 10. When the rinse water and hydrocarbons reach the surface they flow over weir 11 and exit through conduit 11a.

A sand conveying device 50 is situated in the bottom portion of reactor 10 for removing sand in layer 14 from reactor 10. Sand conveying device 50 operates in conjunction with gravity to remove sand from reactor 10 through an aperture 18 at the base of reactor 10.

Sand conveying device 50 may comprise, for example, an air injection device 51. Air injection device 51 comprises at least one air injector positioned to direct compressed air downwardly. Sand conveying device 50 may also comprise a conical plate 56 attached to a base 55. Base 55 may comprise a rigid perforated plate. Air injection device 51 may be mounted at the top of conical plate 56. Air injection device 51 may be threadedly attached to conical plate 56, for example. Air injection device 51 is in fluid communication with a conduit 52. Conduit 52 supplies compressed air to injection device 51. A valve 53 may be provided in conduit 52 to control the flow of compressed air. Air injection device 51 may comprise a non-return valve 54 at its lower end. Non-return valve 54 may comprise, for example, a duckbill type valve, and may be made from an oil resistant elastomer. Non-return valve 54 permits the injection of compressed air into sand layer 14 while preventing sand from obstructing air injection device 51.

Aperture 18 at the base of rector 10 provides fluid communication between rector 10 and a conduit 17. A valve 16 is provided in conduit 17 for controlling the flow of sand out of reactor 10. Valve 16 may operate under the control of a controller 93. Valve 16 may be, for example, actuated pneumatically in response to a signal received by controller 93 from a sand level detector 92. Controller 93 may also control the operation of valve 53. Sand level detector 92 may comprise, for example, an ultrasonic measurement device which emits ultrasonic pulses toward layer 14 and determines the height of layer 14 based on the time it takes for the pulses to be reflected. Alternatively, controller 93 and sand level detector 92 may be incorporated into a single device.

Valve 53 operates in conjunction with valve 16 to control the thickness of sand layer 14. Sand may be provided to reactor 10 wither continuously or intermittently, and the rate of removal of sand from reactor 10 may be controlled through the operation of valves 16 and 53 to maintain a relatively constant thickness of sand layer 14. When the sand level rises above a desired thickness, sand level detector 92 sends a signal to controller 93 which in turn sends a signal to valve 53 which causes valve 53 to increase the flow of compressed air to air injection device 51. Valve 16 also receives a signal from controller 93 and is urged towards its open position. The compressed air from sand conveying device 50 forces sand downwardly through aperture 18. Valve 16 permits the flow of sand at controlled rate out of reactor 10. When the sand level drops below a desired thickness, sand level detector 92 sends a signal to controller 93 which in turn sends a signal to valve 53 which causes valve 53 to move towards its closed position, reducing the flow of compressed air through air injection device 51. Furthermore, controller 93 sends a signal to valve 16 which causes valve 16 to move towards its closed position to restrict the flow of sand exiting reactor 10. Sand conveying device 50, in conjunction with sand level detector 92, controller 93 and valves 53 and 16 may thus maintain a relatively constant thickness of sand layer 14 by urging sand out of aperture 18 at a rate approximately equal to a rate at which sand is deposited on layer 14.

The thickness of sand layer 14 may be maintained, for example, between a low-level limit and a high-level limit. The low-level limit may be selected such that the weight of the sand in layer 14 partially dewaters the sand in layer 14. The high-level limit may be selected such that there is sufficient separation between the top of layer 14 and the bottom of rinsing device 30 to prevent agitation of layer 14 by sand exiting rinsing device 30.

Reactor 10 may also comprise two sand level switches 90 and 91 connected to provide signals to controller 93 to provide redundant control for the thickness of sand layer 14. High-level switch 91 may be positioned at the high-level limit and low-level switch 90 may be positioned at the low-level limit. In the event that sand level detector 92 malfunctions sand may gradually reach low-level switch 90 or high-level switch 91. High-level switch 91 may override the signals transmitted by sand level detector 92 to controller 93 and cause controller 93 to urge valves 53 and 16 to their open positions to permit the evacuation of sand from reactor 10. The evacuation of sand from reactor 10 causes the sand level to drop relatively quickly. Likewise, a low sand level may cause low-level switch 90 to override the signals sent from sand level detector 92 to controller 93 and cause controller 93 to urge valves 53 and 16 towards their closed positions. As valves 53 and 16 close, sand will be prevented from leaving reactor 10 and the level of layer 14 will eventually rise as sand is fed to reactor 10. Reactor 10 will thus be able to operate in an emergency mode with the sand level fluctuating between high and low levels under control of switches 90 and 91 until proper operation of sand level detector 92 is restored.

Conveying device 50 may be held in place in the bottom portion of reactor 10 by a rod member 57. Rod member 57 may be attached to base 55 near its upper end, and attached to the inner walls of conical section 15 of reactor 10 by brackets (not shown) near its lower end.

A sealing device 59 may be slidingly mounted on rod member 57 beneath air injection device 51. Sealing device 59 is moveable into a sealing position wherein sealing device 59 blocks an aperture 18 at the bottom of conical section 15 of reactor 10. The density of sealing device 59 is preferably greater than water density and lower than sand density. Consequently sealing device 59 is buoyant when surrounded by sand and rises along rod member 57, moving away from the sealing position and allowing sand to reach aperture 18. Alternatively, when surrounded by water, sealing device 59 sinks along rod member 57 and moves toward the sealing position.

Sealing device 59 provides further redundancy for controlling the thickness of sand layer 14. In the absence of sand, device 59 descends to the lowest position permitted by rod 57 and substantially seals the lower portion of the feed reactor 10. As a result, water is prevented from entering the next reactor or dewatering device (see FIG. 1).

Sealing device 59 may comprise two hollow cones having their bases affixed together. An aperture 57a is defined through sealing device 59 to allow sealing device 59 to slide up and down along rod member 57. An O-ring 58 is affixed to the mid portion of sealing device 59. O-ring 58 provides a sealable contact with the walls of reactor 10 to block aperture 18 when sealing device 59 sinks in water and is guided by rod member 57 into the sealing position.

It is evident to those skilled in the art that other arrangements may be utilized to convey sand between reactors without departing from the spirit and scope of the invention. For example, other sand conveying devices may be used instead of sand conveying device 50. In some such embodiments, sand transfer between reactors may not be assisted by gravity. The thickness of sand in layer 14 at the lower portion of reactor 10 may be controlled in a similar fashion by means of a sand level detector and redundant high and low level switches respectively. The sand level detector may control the rate of removal of sand from each reactor 10 and thus the flow rate of sand being transferred between reactors 10. High and low level switches may permit reactors 10 with other types of sand conveying devices to operate in emergency situations.

Figure 4:
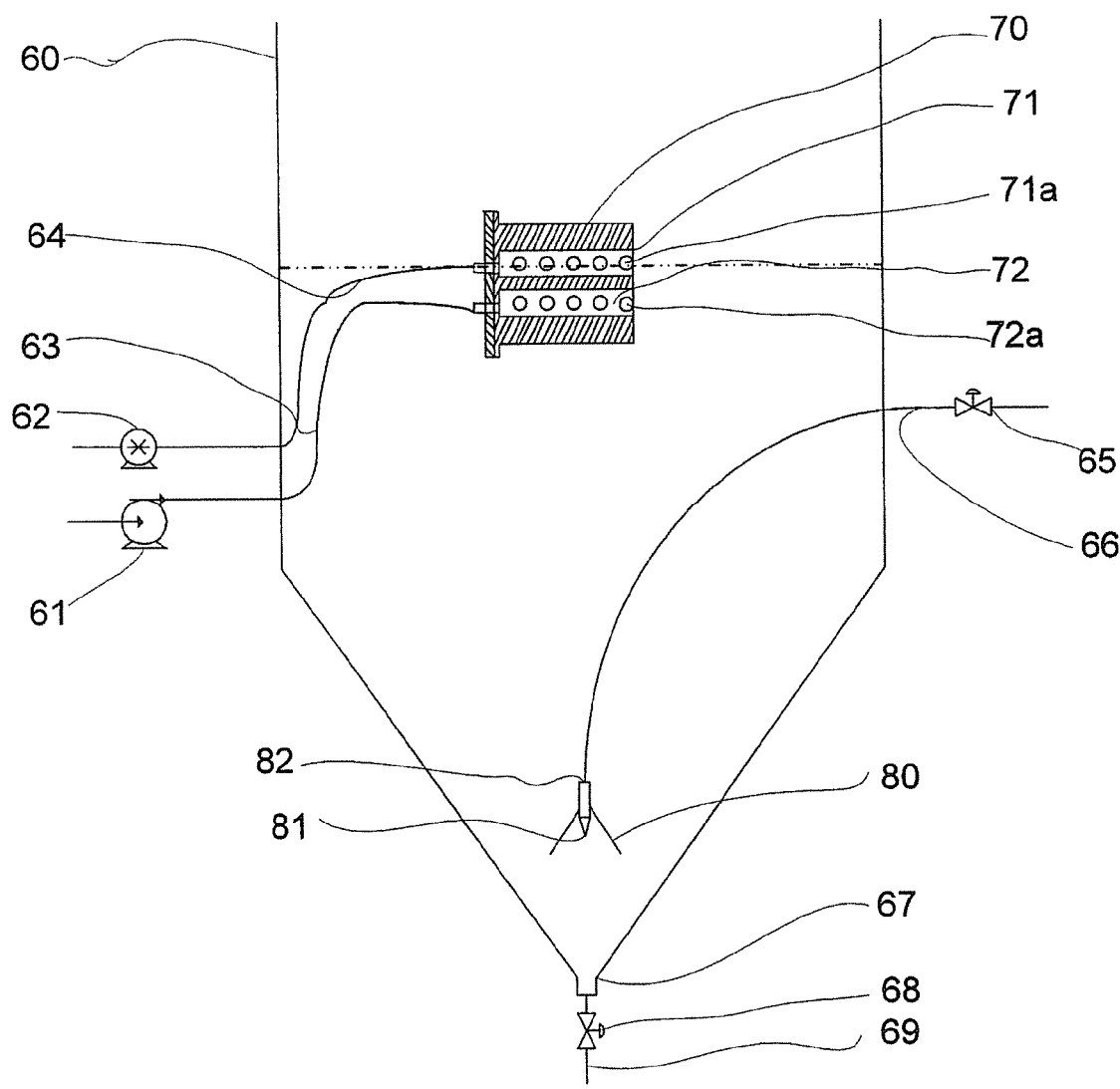
FIG. 4 shows a settling tank according to one embodiment of the invention.

FIG. 4 shows a clarifier 60 according to one embodiment of the invention. Clarifier 60 comprises a cylindrical vessel with a cone-shaped lower portion. The cone-shaped lower portion of clarifier 60 may have inner walls whose angles of inclination preferably exceed 60 degrees. A pump 61 receives water which may contain contaminants and fines from a separator (not shown in FIG. 4) and fills clarifier 60 through a conduit 63 coupled to a floating device 70. Another pump 62 is coupled to floating device 70 by a conduit 64 for removing a hydrocarbon layer from the surface of the water in clarifier 60.

Figure 5:
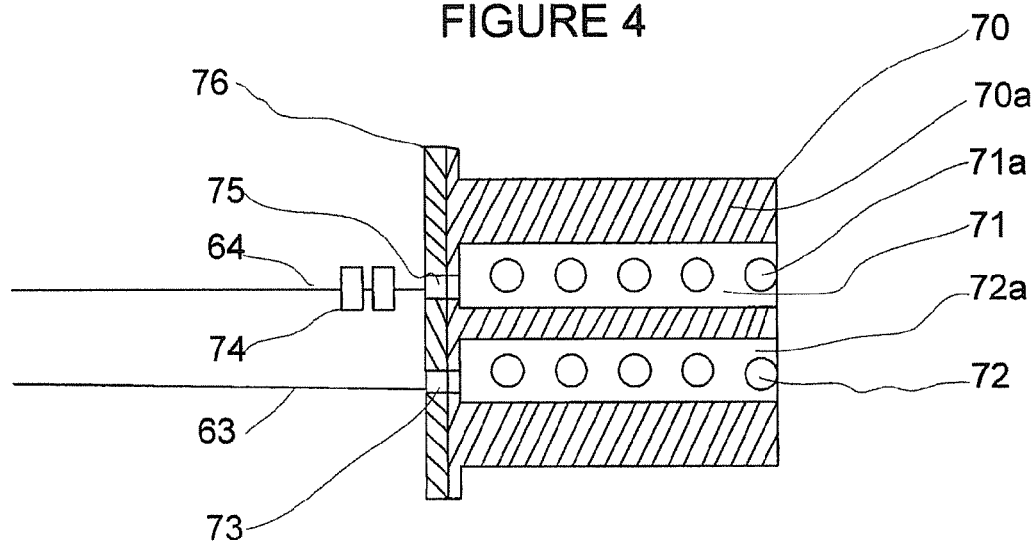
FIG. 5 shows the floating device of the settling tank of FIG. 4 in isolation.

As shown in FIG. 5, floating device 70 comprises a preferably cylindrical body segment 70a made from low-density polypropylene or a similar material. A tubular cavity 71 is defined in the upper portion of body segment 70a. Tubular cavity 71 extends longitudinally along body segment 70a. A plurality of apertures 71a in body segment 70a provide fluid communication between clarifier 60 (not shown in FIG. 5) to cavity 71. A similar tubular cavity 72 and apertures 72a are defined in the lower portion of body segment 70a. Apertures 72a provide fluid communication between clarifier 60 to cavity 72. A circular lid 76 is attachable to body segment 70a and encloses cavities 71 and 72 of body segment 70a at one end. Ports 75 and 73 defined in lid 76 and body segment 70a provide fluid communication between conduits 64 and 63 and cavities 71 and 72, respectively.

Floating device 70 is submerged in liquid preferably to the mid portion of cavity 71 in order to ensure effective oil skimming. A plurality of rings 74 that are less dense than water may be attached to conduit 64 in order to adjust the level of cavity 71 in relation to the surface of the water in clarifier 60. Cavity 72 is permanently submerged below the water surface.

Floating device 70 provides means for introducing liquid into clarifier 60 with minimal agitation. When clarifier 60 is filled, liquid from pump 61 emerges through apertures 71*a* creates a laminar flow that uniformly spreads the liquid in clarifier 60. This allows fines in the liquid to begin settling even as clarifier 60 is being filled. During the filling cycle, floating device 70 also distributes traces of oil evenly on the water surface. This enhances oil-water separation and subsequent oil removal during the skimming cycle.

Once clarifier 60 has been filled, pumps 61 and 62 remain inactive during a settling period. During the settling period, fines in clarifier 60 accumulate at the bottom of the lower portion, and traces of oil that reach clarifier 60 are separated form a film on the surface of the water. The settling period may be relatively short, since floating device 70 reduces agitation as clarifier 60 is filled. As a result, the size of clarifier 60 can be significantly reduced with corresponding savings.

After the traces of oil have formed a layer on the surface of the water, an oil skimming cycle is initiated. Pump 62 is activated to draw oil into cavity 71 via apertures 71*a* and then out of clarifier 60 through conduit 64. Oil skimming may be controlled by way of a timing device (not shown) set conveniently to ensure effective oil removal. For example, the timing device may be configured to initiate oil skimming a predetermined amount of time after the end of the filling cycle.

After the settling period, the length of which may depend on the size of clay and silica particles, separation of fines is completed. Fines are deposited at the lower portion of clarifier 60. Fines are then removed periodically from the clarifier 60 through an arrangement similar to that of reactor 10 of FIG. 3. A timer (not shown) may initiate the evacuation of fines and cause compressed air to be supplied to an air injection device 82 via a conduit 66 by opening a valve 65. The compressed air fluidizes the fines and a cone 80 localizes the agitation to a limited area. A valve 68 is also opened by the timer which permits the evacuation of fines from clarifier 60 via conduit 69. The fines may be provided to a dewatering device (not shown), which may be situated, for example, below clarifier 60. When the evacuation of fines is completed the timer closes valves 65 and 68 respectively.

Upon completion of the oil skimming cycle and the evacuation of fines, pump 61 is activated to draw water from below the surface into cavity 72 via apertures 72*a* and then out of clarifier 60 through conduit 63. Floating device 70 maintains apertures 72 near the surface of the water, reducing removal of fines along with the water. Pump 61 may provide the removed water to a polishing oily-water separator (not shown in FIGS. 4 and 5) for further processing.

Figure 6:
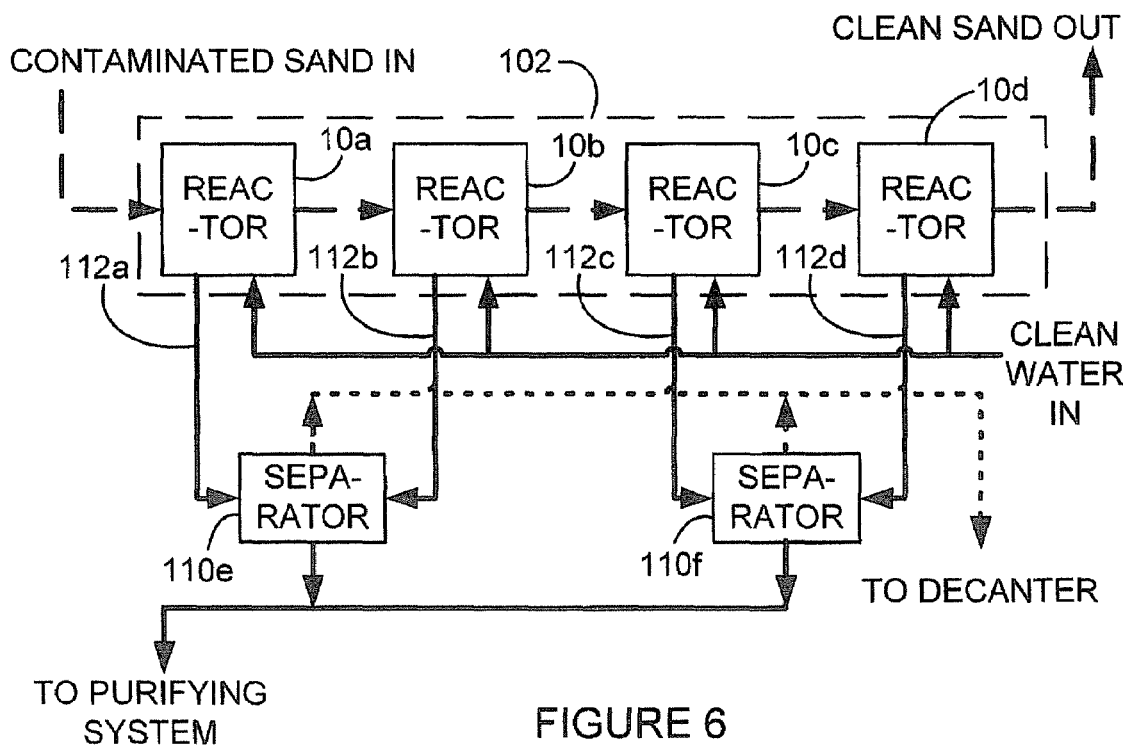
FIG. 6 shows a portion of a system for washing sand according to another embodiment of the invention; and, FIG. 7 shows a portion of a system for washing sand according to another embodiment of the invention.
Figure 7:
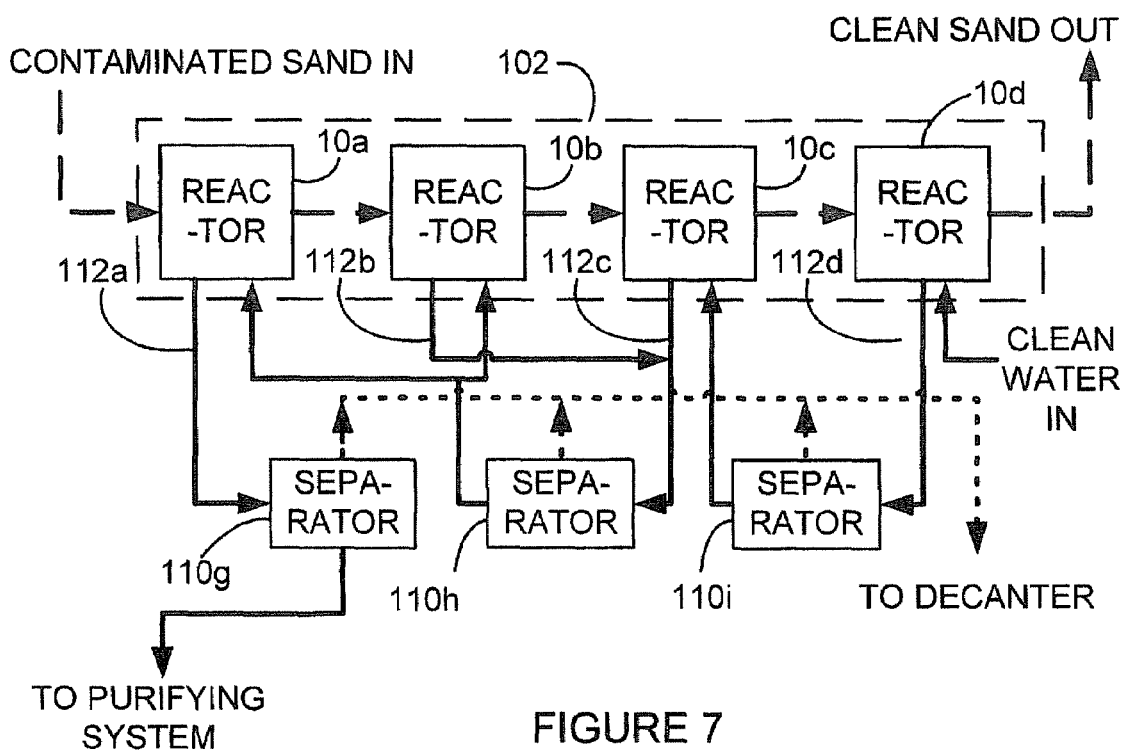

While a number of exemplary aspects and embodiments have been discussed above, those of skill in the art will recognize certain modifications, permutations, additions and sub-combinations thereof. For example, FIGS. 6 and 7 show alternative arrangements of a portion of a system for washing sand according other embodiments of the invention. The portions shown in FIGS. 6 and 7 could be used in place of reactors 10 and separators 110 in conjunction with the other elements of system 100 of FIG. 1.

In the FIG. 6 embodiment, each reactor 10 receives clean water for use as rinse water. Fluid outlets 112*a* and 112*b* of reactors 10*a* and 10*b* are both connected to one separator 110*e*, and fluid outlets 112*c* and 112*d* of reactors 10*c* and 10*d* are both connected to another separator 110*f*. Both of separators 110*e* and 110*f* provide the first portion of fluid to the purifying system (not shown in FIG. 6). As one skilled in the art will appreciate, the FIG. 6 embodiment could comprise additional separators, or a single separator connected to all of the fluid outlets 112 of reactors 10.

In the FIG. 7 embodiment, clean water is provided as rinse water to last reactor 10*d*, and fluid outlet 112*d* is connected to separator 110*i* which provides rinse water to reactor 10*c* (as in system 100 of FIG. 1). The FIG. 7 embodiment differs from the FIG. 1 embodiment in that fluid outlets 112*b* and 112*c* of reactors 10*b* and 10*c* are both connected to separator 110*h* which supplies rinse water to both reactor 10*b* and first reactor 10*a*. Fluid outlet 112*a* of first reactor 10*a* is connected to separator 110*g*, which supplies the first portion of fluid to the purifying system (not shown in FIG. 7).

It is therefore intended that the following appended claims and claims hereafter introduced are interpreted to include all such modifications, permutations, additions and sub-combinations as are within their true spirit and scope.

What is claimed is:

1. A system for washing sand contaminated with hydrocarbons, the system comprising:
   a plurality of reactors for washing and rinsing sand, the plurality of reactors arranged in a sequence from a first reactor to a last reactor, the first reactor configured to receive contaminated sand, each reactor comprising a funnel portion in a lower section thereof for accumulating a layer of sand and a sand conveying device for removing sand in said layer from that reactor through an aperture defined near a bottom of the funnel portion, wherein each reactor except the first reactor is disposed to receive sand removed from a previous reactor in the sequence, each reactor having a fluid outlet associated therewith for removing fluid therefrom;
   a steam supply system for providing each of the plurality of reactors with steam for washing the sand;
   a water supply system for providing the last reactor with clean water for rinsing the sand;
   a separator associated with each reactor and connected to the fluid outlet thereof, each separator configured for separating the fluid from the associated reactor into a first portion containing a relatively low proportion of hydrocarbons and a second portion containing a relatively high proportion of hydrocarbons, wherein each reactor except the last reactor is disposed to receive the first portion of fluid from the separator associated with a next reactor in the sequence for rinsing the sand.

2. A system according to claim 1 comprising:
   a dewatering device connected to receive sand removed from the last reactor.

3. A system according to claim 1 comprising:
   a purifying system connected to receive the first portion of fluid from the separator associated with the first reactor and return clean water to the water supply system.

4. A system according to claim 1 wherein the sand conveying device of each reactor comprises an air injection device for urging sand our of the aperture using compressed air, the air injection device comprising at least one air injector positioned to direct compressed air downwardly.

5. A system according to claim 4 comprising, for each reactor, a sand level detector for detecting a thickness of said layer, a sand valve coupled to a conduit connected to the aperture for controlling, and a controller for controlling a flow of compressed air and the operation of the sand valve in response to signals received from the sand level detector to maintain the thickness of said layer relatively constant.

6. A system according to claim 4 wherein the air injection device comprises a non-return valve for preventing sand from obstructing the at least one air injector.

7. A system according to claim 4 wherein the sand conveying device of each reactor comprises a conical plate attached to a perforated base, wherein the air injection device is mounted at a top of the conical plate.

8. A system according to claim 3 wherein the purifying system comprises:
   a plurality of clarifiers for separating hydrocarbons and fines from the first portion of fluid to produce clarified water;
   a polishing oily-water separator for receiving the clarified water and reducing the hydrocarbon content of the clarified water below a predetermined level to produce polished water; and,
   a desalination device for receiving the polished water and removing salts from the clarified water, wherein the plurality of clarifiers are connected to the separator associated with the first reactor, and the polishing oily-water separator and the desalination device are connected in series downstream of the plurality of clarifiers.

9. A system according to claim 8 comprising a valve configured to direct the first portion of fluid to each of the plurality of clarifiers in turn.

10. A system according to claim 8 wherein each clarifier comprises a floating device having an outlet for introducing the first portion of fluid into the clarifier, wherein the floating device rises and falls with a fluid level in the clarifier such that a distance between the outlet and a bottom of the clarifier increases as the clarifier is filled.

11. A system according to claim 10 wherein the outlet of the floating device comprises a first plurality of apertures positioned to be below the fluid level in the clarifier when the floating device floats on the fluid for creating a laminar flow of fluid while the clarifier is being filled.

12. A system according to claim 11 wherein the floating device comprises a second plurality of apertures positioned to be aproximately level with the fluid level in the clarifier when the floating device floats on the fluid, the second plurality of apertures connected to a conduit for skimming off a hydrocarbon layer from a top of the fluid before the clarifier is emptied.

13. A system according to claim 8 further comprising:
   a gasification device for receiving fines separated from the first portion of fluid in the clarifiers and burning any hydrocarbons remaining in the fines.

14. A method for washing sand contaminated with hydrocarbons, the method comprising:
   providing a plurality of reactors for washing and rinsing sand, each reactor having a separator associated therewith, the plurality of reactors arranged in a sequence from a first reactor to a last reactor;
   introducing contaminated sand into the first reactor;
   for each reactor in the sequence:
      washing the sand with steam as the sand is introduced into the reactor;
      rinsing the sand with fluid removed from a next reactor in the sequence, or with clean water in the case of the last reactor;
      removing fluid comprising water and hydrocarbons from the reactor;
      at the associated separator, separating the removed fluid into a first portion containing a relatively low proportion of hydrocarbons and a second portion containing a relatively high proportion of hydrocarbons;
      providing the first portion from the associated separator to a previous reactor in the sequence for rinsing the sand, or to a water outlet in the case of the first portion from the first reactor;
      forming a layer of sand in a bottom portion of the reactor;
      urging sand in the layer out of an aperture defined in the bottom of the reactor at a rate approximately equal to a rate at which sand is deposited on the layer to maintain a relatively constant thickness of the layer; and,
      providing the sand urged out of the aperture to the next reactor in the sequence, or to a sand output in the case of the last reactor.

15. A method according to claim 14 wherein providing the first portion to a water outlet in the case of the first portion from the first reactor comprises providing the first portion to a purifying system.

16. A method according to claim 15 comprising:
   purifying the first portion from the first reactor in the purifying system to produce purified water.

17. A method according to claim 16 comprising:
   providing the purified water to the last reactor.

18. A method according to claim 16 wherein purifying the first portion comprises separating fines from the first portion, the method further comprising:
   providing the separated fines to a gasification device and burning any hydrocarbons remaining in the fines in the gasification device.

19. A method according to claim 14 wherein providing the sand urged out of the aperture to a sand output in the case of the last reactor comprises providing the sand to a dewatering device.

20. A method according to claim 14 comprising:
   providing the second portion to a hydrocarbon reclamation device.

21. A method according to claim 14 wherein urging sand in the layer out of the aperture comprises injecting compressed air into the layer and opening a valve coupled to the aperture.

22. A method according to claim 21 comprising monitoring a level of the layer and controlling the injecting of compressed air and the opening of the valve such that the rate at which sand is urged out of the aperture is increased when the thickness of the layer is above a desired thickness and the rate at which sand is urged out of the aperture is decreased when the thickness of the layer is below the desired thickness.

23. A method according to claim 22 comprising controlling the injecting of compressed air and the opening of the valve such that the thickness of the layer is maintained between a low-level limit and a high-level limit.

24. A method according to claim 23 wherein the low-level limit is selected such that a weight of sand in the layer partially dewaters sand in the layer.

* * * * *